Dec. 4, 1951   J. P. JAKOB   2,576,942
APPARATUS FOR THE CONTINUOUS SPRAYING
OF INDIVIDUAL CONTAINER BODIES
Filed July 6, 1948   4 Sheets-Sheet 1

INVENTOR.
John P. Jakob
BY Ivan D. Thornburgh
Charles H. Erne
ATTORNEYS

Dec. 4, 1951 J. P. JAKOB 2,576,942
APPARATUS FOR THE CONTINUOUS SPRAYING
OF INDIVIDUAL CONTAINER BODIES
Filed July 6, 1948 4 Sheets-Sheet 2

INVENTOR.
John P. Jakob
BY Ivan D. Thornburgh
Charles H. Gene
ATTORNEYS

Dec. 4, 1951 J. P. JAKOB 2,576,942
APPARATUS FOR THE CONTINUOUS SPRAYING
OF INDIVIDUAL CONTAINER BODIES
Filed July 6, 1948 4 Sheets-Sheet 3
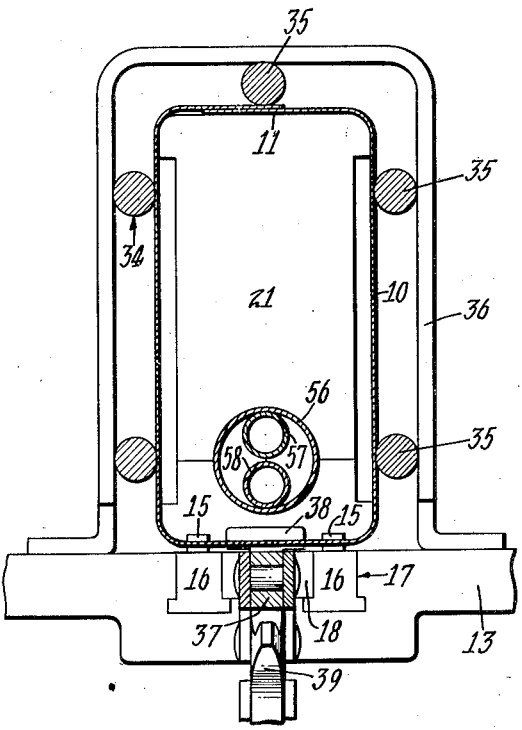
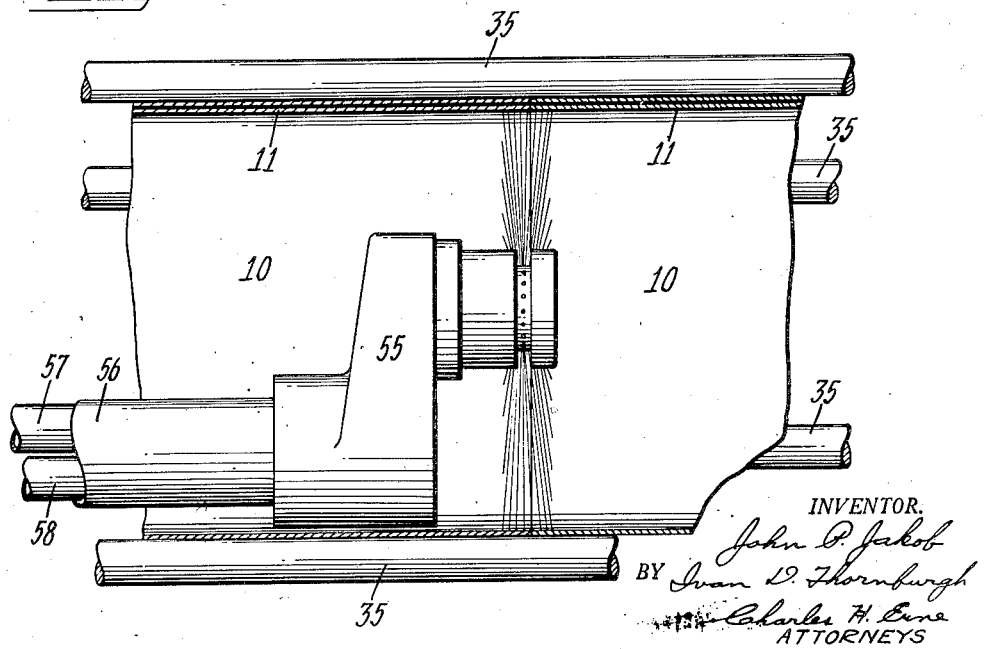
INVENTOR.
John P. Jakob
BY Ivan D. Thornburgh
Charles H. Eine
ATTORNEYS

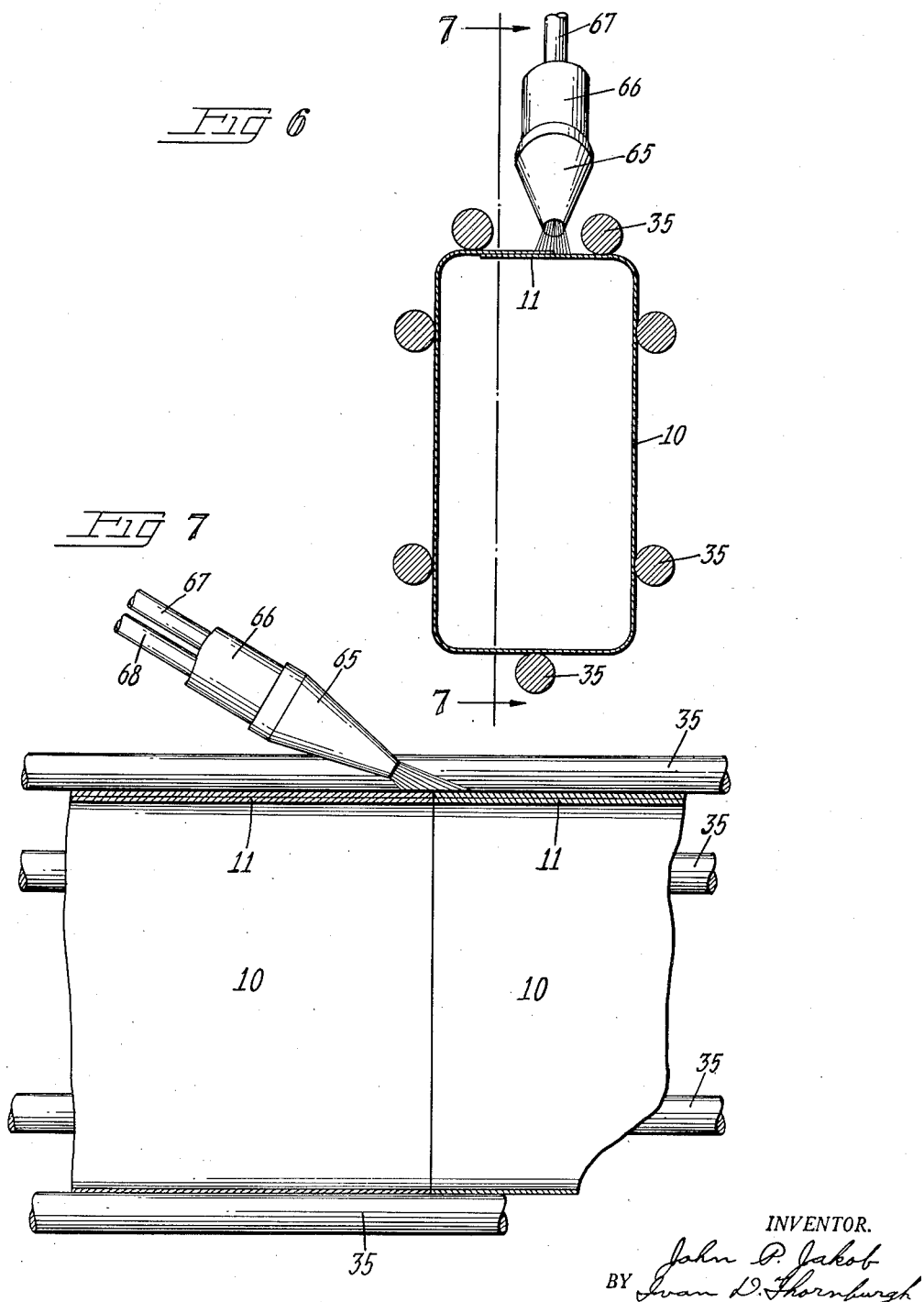

Patented Dec. 4, 1951

2,576,942

UNITED STATES PATENT OFFICE 2,576,942

APPARATUS FOR THE CONTINUOUS SPRAYING OF INDIVIDUAL CONTAINER BODIES

John P. Jakob, Roselle, N. J., assignor to American Can Company, New York, N. Y., a corporation of New Jersey Application July 6, 1948, Serial No. 37,153

3 Claims. (Cl. 91—45)

1

The present invention relates to an apparatus for treating container bodies wherein a continuously operating spraying device is utilized to apply a uniform layer of coating material to container bodies which are received in spaced endwise relation and which are brought into abutting engagement with each other in endwise relation to form a continuous tube without space between individual bodies during the coating operation.

In the container manufacturing industry it is often desirable to coat selected portions of container bodies with a protective coating material before the ends are attached to the bodies. The bodies are usually formed by wrapping individual body blanks around a forming mandrel or horn in such a manner that they are spaced from each other as they are fed endwise along or from the horn.

According to this invention container bodies which are thus initially fed in spaced end-to-end alignment along a predetermined path of travel are coated by means of a continuously operating spraying device. This is accomplished by bringing the spaced separate bodies into endwise abutting relation to thereby form an unbroken procession of bodies having no spaces therebetween. In effect, a continuous tube formed of individual bodies is thereby produced and the necessity for intermittently operating the spraying device, to avoid projecting the sprayed material into the spaces which would otherwise occur between the bodies, is avoided. It is desirable and advantageous to eliminate intermittently operated spraying devices since they are comparatively complicated and difficult to maintain, are often inaccurate, and have a tendency to clog during operation.

An object of the invention, therefore, is to provide an apparatus for spraying selected surfaces of endwise or axially aligned separate container bodies wherein the bodies are moved from spaced relation into abutting relation as they are fed along a predetermined path of travel to thereby make possible the use of a continuously operating spraying device without wastage of the sprayed material.

Another object of the invention is to provide an improved spraying apparatus wherein it is possible to utilize a continuously open spraying device to coat either the interior or the exterior surfaces of container bodies which are received in endwise spaced relation without having the coating material soil the opposite surfaces of the bodies.

2

A further object of the present invention is to provide an apparatus for continuously spraying separate endwise aligned container bodies wherein individual bodies which are initially fed intermittently in spaced relation are formed into a continuously moving procession of contiguous bodies forming a continuous tube to permit the application of a uniform layer of coating material to the bodies by a continuously open spraying device.

A still further object of the invention is to provide a continuous spraying apparatus which can be used to simultaneously apply a coating material to selected portions of the interior surfaces and the same or different coating material to selected portions of the exterior surfaces of container bodies which are received in endwise spaced relation without danger of one coating operation interfering with the other or of mixing the different materials.

Numerous other objects and advantages of the invention will be apparent as it is better understood from the following description, which, taken in connection with the accompanying drawings, discloses a preferred embodiment thereof.

Referring to the drawings:

Fig. 4 is a detail in vertical section taken substantially along the line 4—4 in Fig. 3;

Fig. 5 is an enlarged detail in vertical section taken substantially along the line 5—5 in Fig. 1;

Fig. 6 is a sectional detail similar to Fig. 3 but showing a modified form of the invention; and Fig. 7 is a sectional detail taken substantially along the line 7—7 in Fig. 6.

As a preferred embodiment of the instant invention the drawings illustrate a unitary machine structure (Fig. 1) in which individual fibre container bodies 10 having their edges secured in glued lap side seams 11 and having their entire inner surfaces coated with a suitable coating material are produced from precut body blanks 12. One marginal edge portion of the blanks carries a band of thermoplastic adhesive for securing the side seam edges of the formed bodies.

Figure 1:
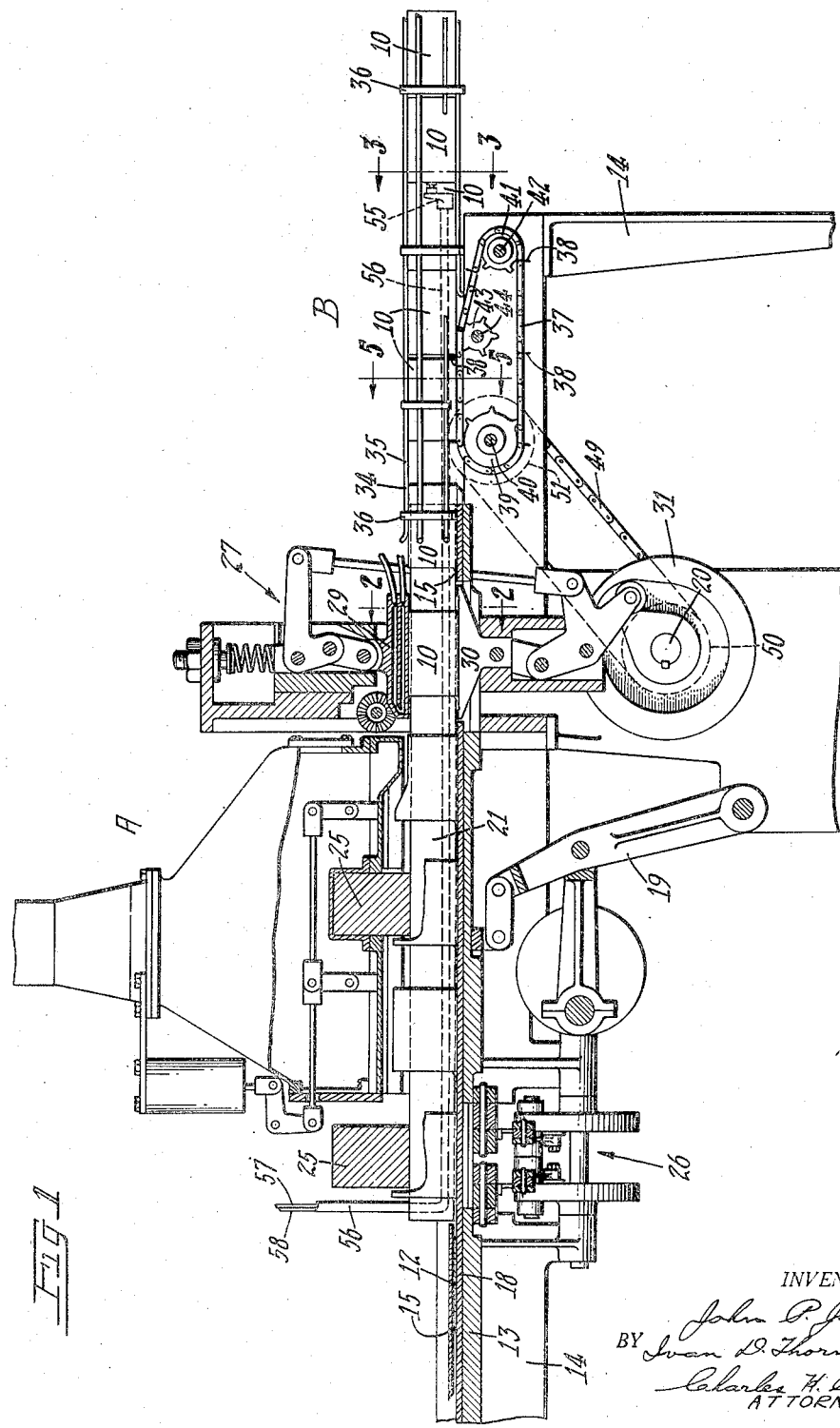
Figure 1 is a vertical longitudinal sectional view of a machine embodying the instant invention and adapted for use in carrying out the invention, parts being broken away.

In the machine illustrated in Fig. 1, the container body blanks 12 are preferably introduced at one end thereof (at the left as shown in Fig. 1) into a container body forming section which is designated as A. The container blanks 12 are formed into the container bodies 10 as they are moved along a predetermined path of travel and the formed bodies are then fed into a spraying section B where their interiors and/or exteriors are covered with a suitable coating material. The coated bodies then pass from the spraying section B and are discharged to any suitable place of deposit.

The container body forming section A of the machine is in effect a regular fibre bodymaker of which there are numerous well known constructions. The form used in this machine is of the character disclosed in United States Patent 2,169,311 issued August 15, 1939 to M. E. Widell and entitled "Can-Body Maker."

In such a machine flat fibre container body blanks 12 are advanced in a horizontal position along the top of a bed 13 which constitutes a part of a machine main frame 14. The blanks 12 are preferably advanced in spaced relationship in a step-by-step movement by means of feed dogs 15 which are carried in a pair of spaced and parallel reciprocating feed bars 16 which operate in longitudinal grooves 17 formed partially in the bed 13 and partially in a plate 18 which is secured to the bed between the feed bars.

The feed bars 16 are reciprocated in unison in time with the other moving parts of the machine through a rocker arm 19 which is suitably connected to and is operated from a main drive shaft 20 of the machine.

During their advancement along the bed 13, the body blanks 12 are moved along and under a stationary body forming mandrel or inside horn 21. In this particular embodiment of the invention, the inside horn is illustrated as being substantially rectangular in shape in order to produce a container body having the rectangular cross-section illustrated in Fig. 2.

The inside horn 21 is suspended in spaced relation to the top of the bed 13 by a pair of overhanging brackets 25 which are bolted to the bed. These brackets 25 are located adjacent the inner end of the inside horn 21 so that its outer end will be unsupported and free of obstructions to permit the discharge of formed container bodies therefrom.

As a blank passes under the horn it is folded upwardly adjacent the sides of the horn to form a U-shaped partially formed container body. This is preferably done by wing elements located adjacent the supported end of the inside horn 21 at a bending station 26 as disclosed in the aforementioned Widell patent. The adhesive on the blanks preferably is heated to a tacky condition at this station.

At a subsequent station 27, beyond the brackets 25, the upright portions of the U-shaped partially formed body are folded down over the top of the inside horn 21 into overlapping relationship to produce a completed container body 10 formed with a side seam 11 (Fig. 2) having its overlapped portions glued together. This seam 11 is completed at the station 27 by a bumping hammer 29.

Figure 2:
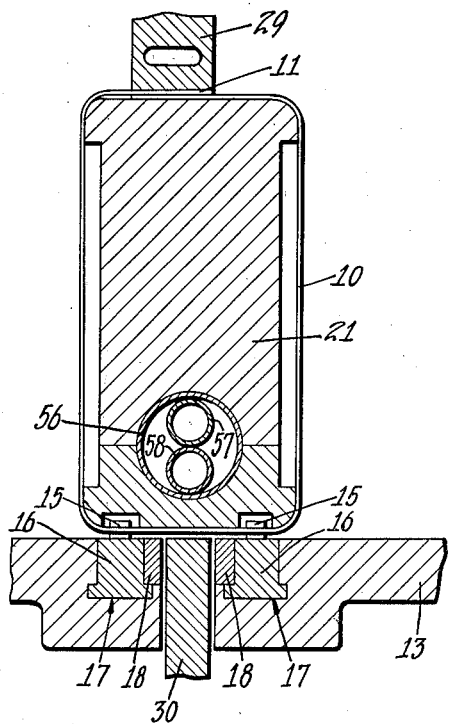
Fig. 2 is an enlarged vertical sectional detail taken substantially along the line 2—2 in Fig. 1.

During the bumping of the seam the outer end of the inside horn 21 is supported from below by a vertically movable anvil 30 which operates in vertically aligned slots cut in the bed 13 and the plate 18 (Figs. 1 and 2). The bumping hammer 29 and the supporting anvil 30 are actuated in unison from a cam 31 keyed to the main drive shaft 20.

As can be seen from Fig. 1, the bed 13, the plate 18, the feed bars 16 and the horn 21 extend to the right beyond the bumping station 27 and terminate adjacent the entrance end of the spraying section B.

The formed container bodies 10 are passed from the bodymaker section A to the spraying section B by reciprocation of the feed bars 16. As the bodies leave the horn 21, they enter an outside horn 34 which is in longitudinal alignment with the inside horn 21. This outside horn 34 comprises a plurality of guide bars or rails 35 which maintain the container bodies 10 in the shape given to them in the body forming section A. The guide rails 35 are held in place by means of brackets 36.

As the container bodies 10 are pushed into the outside horn 34 in spaced relation by the feed bars 16, they are received on a continuously moving endless conveyor chain 37 (Figs. 1 and 5) provided with a plurality of feed dogs or fingers 38. The chain 37 is located under the horn 34 adjacent its entrance end and is preferably placed along the longitudinal center of the horn so that it does not interfere with the forward stroke of the feed bars 16. The chain 37 is disposed in a vertical plane and passes around a drive sprocket 39 which is mounted on a shaft 40 and around a driven sprocket 41 mounted on a shaft 42. A third, or supporting sprocket 43, mounted on a shaft 44, is provided to keep the upper flight of the chain 37 parallel to the path of travel of the container bodies for a portion of its travel as it moves to the right. After passing the supporting sprocket 43, the upper flight of the chain 37 gradually moves downwardly until it reaches the driven sprocket 41. The shafts 40, 42 and 44 are journaled in bearings formed in the main frame 14.

The chain 37 is driven from the bodymaker drive shaft 20 by means of a drive chain 49, taking over a drive sprocket 50, keyed to the shaft 20 and over a driven sprocket 51 keyed to the shaft 40.

The chain 37 moves at a slower rate of travel than the feed bars 16 when they advance through their forward stroke. This enables the feed fingers 15 to slide a container body 10 over the more slowly moving chain 37 until it contacts the rear side of a dog or finger 38 on the chain 37. At this point, the front side of the following finger 38 moves around the sprocket 39 into position behind and engages the rear edge of the body, while the feed bars 16 cease their forward movement and begin to move backwardly on their return stroke. Control of the body is thus transferred from the feed bars 16 to the chain 37. The fingers 38 are so spaced on the chain 37 that the distance between the rear edge of one finger and the front edge of the next finger equals the length of a container body.

As a result of the sliding of a container body over a portion of the chain 37, the spacing between succeeding bodies is reduced to the thicknesses of the fingers 38. By making the fingers or dogs as thin as possible, this spacing can be almost eliminated or reduced to a minimum.

Continued movement of the chain 37 advances the finger 38 beyond the supporting sprocket 43. The finger now moves downwardly at an angle to the path of travel of the container body and gradually slips from behind and thus releases the body. The released body slows up almost imperceptibly until the following container body, which in the meantime has been picked up and is being propelled by the succeeding finger 38, comes into abutting relation with it and pushes it along the horn 34. In this manner substantially continuous movement of the released body is effected.

The preceding container bodies, all of which have previously been brought into endwise abutting relationship in the manner just described to form an unbroken procession of bodies are likewise pushed along the horn 34, the necessary pressure being transmitted from each body to the body immediately preceding it.

From the foregoing description it can be seen that as a result of the transfer of the can bodies from the body forming section A to the spraying section B, the spacing between the bodies is completely eliminated, and the motion of the bodies is changed from a step-by-step to a substantially continuous movement.

Figure 3:
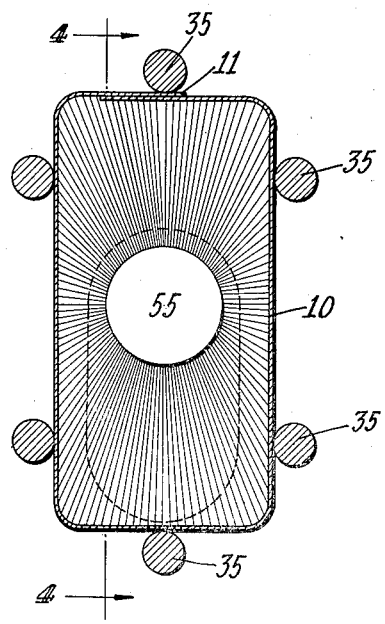
Fig. 3 is an enlarged vertical sectional detail taken substantially along the line 3—3 in Fig. 1.

As the bodies travel along the outside horn 34 of the spraying section B, they move past a continuously operating spraying element or nozzle 55 which is located within the horn 34. As illustrated in Figs. 3 and 4 the nozzle 55 is adapted to spray the entire interior surface of the body with a uniform film or layer of a suitable coating material such as paraffin, lacquer, or other desired material and thus delivers what might be termed a full circle or 360 degree spray, but it should be understood that the nozzle may be constructed to direct the spray upon a more specifically selected portion of the container interior, for example, the side seam area if desired.

The nozzle 55 is supported by a sleeve 56 (Figs. 1, 4 and 5) which projects from the outer end of the inside horn 21. The sleeve 56 extends back for almost the entire length of the inside horn 21 and then emerges at the top of the inner end of the latter (Fig. 1) where it does not interfere with the forming of the bodies 10. The inside horn 21 is preferably made in sections to accommodate the sleeve 56 (Fig. 2).

The flowable coating material for spraying the container bodies is conducted to the nozzle 55 through a conduit 57 disposed within the sleeve 56. The inner end of the conduit 57 is connected to any suitable source of supply of coating material. Heated compressed air or other fluid medium which is utilized in the spray nozzle to atomize the coating material is similarly conducted from a suitable source of supply through a second conduit 58 also disposed within the sleeve 56.

In some instances it may be necessary for best results to melt the coating material in order to have it flow to the spray nozzle. In such cases, the heat which is radiated from the heated air conduit 58 helps maintain the coating material in its molten state. If desired, suitable channels for the circulation of a temperature regulating fluid may also be disposed in the inside horn 21, as disclosed in the above mentioned Widell patent.

As above stated, the continuous procession of bodies is moved past the continuously open spray nozzle 55 in a smooth, substantially uninterrupted movement. This results in the application of a substantially uniform coating to the interiors of the bodies.

Since there are no spaces between the container bodies as they move past the nozzle 55 (as shown in Fig. 4) there is no danger of any of the sprayed coating material escaping from between the bodies. Thus, wastage of coating material is avoided, and there is no danger of the guide rails 35 becoming fouled with material which would thereupon be wiped onto the exterior surfaces of the container bodies.

Continued movement of the container bodies results in their discharge from the outside horn 34 to any suitable place of deposit.

Figs. 6 and 7 illustrate a modified form of the invention wherein an outside spraying element or nozzle 65 is substituted for or used in addition to the inside spraying nozzle 55. The outside nozzle 65 is mounted on a sleeve 66, which in turn is rigidly supported in any suitable manner from the main frame 14.

The coating material flows to the nozzle 65 through a conduit 67 while the heated air or other fluid medium is conducted through a second conduit 68, both conduits being disposed within the sleeve 66. In this modification as by way of example, the spray is directed at a restricted portion of the exterior surfaces of the bodies 10 along their side seams 11 to produce a stripe of coating material which protects and seals the exposed raw edges of the body side seams. The guide rails 35 are preferably located so that they do not contact the coating material after it has been applied.

The coating material is deposited only on the outer surfaces of the container bodies, since there are no spaces between the bodies through which it can pass to reach the interior of the bodies. Contamination or soiling of the interior surfaces of the bodies by the exteriorly applied coating material, is thus avoided.

It will be apparent that by combining the inside nozzle 55 (Figs. 3 and 4) and the outside nozzle 65 (Figs. 6 and 7) in the same machine, it is possible to simultaneously coat selected portions of both the interior and the exterior surfaces of the bodies. The spray from the inside nozzle 55 is confined to the interior surfaces of the bodies, while the spray from the outside nozzle 65 is applied only to the exterior surfaces of the bodies. Thus, one type of coating material may be used to coat the inside of the bodies, while a different material may be applied to the outside of the bodies without danger of mixing the materials.

It is thought that the invention and many of its attendant advantages will be understood from the foregoing description, and it will be apparent that various changes may be made in the form, construction, and arrangement of parts of the apparatus mentioned herein, without departing from the spirit and scope of the invention or sacrificing all of its material advantages, the apparatus hereinbefore described being merely a preferred embodiment thereof.

I claim:

1. Apparatus for continuously and successively coating wall portions of container bodies, comprising means for feeding said bodies in longitudinally spaced relation along a support, a conveyor disposed adjacent said support in advance of said feeding means for successively receiving container bodies from the latter, said conveyor having means thereon for successively engaging the rear ends of container bodies delivered thereto by said feeding means to continuously and successively propel said bodies further along said support with each body in contact with a preceding body in end to end abutting relation, said conveyor means through its engagement with the rear end of a succeeding body propelled by said conveyor further serving to propel therethrough the preceding abutted bodies along said support, guide means disposed adjacent said conveyor and engageable with the wall surfaces of the containers for maintaining the abutting containers in alignment, and means disposed in advance of said conveyor and operative upon the preceding abutting bodies not directly engaged by said conveyor for continuously projecting a coating material successively against the walls of said bodies.

2. Apparatus for continuously and successively coating the walls of container bodies with a liquid coating material, comprising means for feeding said bodies in longitudinally spaced relation along a support, a continuously moving conveyor disposed adjacent said support in advance of said feeding means for successively receiving container bodies from the latter, said conveyor having spaced fingers thereon for successively engaging the rear ends of container bodies delivered thereto by said feeding means to continuously and successively propel said bodies further along said support with each body in contact with a preceding body in end to end abutting relation, guide means disposed adjacent said conveyor and engageable with the wall surfaces of the containers for maintaining the abutting containers in alignment, said conveyor being disposed at a diverging angle to said support to gradually clear and successively remove said fingers from propelling engagement with the rear ends of the container bodies so that a said conveyor finger through its direct engagement with the rear end of a succeeding body propelled by said conveyor serves to propel therethrough in abutting relation the preceding bodies not engaged by said conveyor fingers, and fixed spray means disposed in advance of said conveyor and operative upon the preceding abutting bodies not directly engaged by said conveyor fingers for continuously projecting a liquid coating material successively against the walls of said bodies.

3. Apparatus for continuously and successively coating the walls of container bodies with a liquid coating material, comprising means for feeding said bodies in longitudinally spaced relation along a fixed support, a continuously moving endless chain conveyor disposed in a vertical plane beneath said support in advance of said feeding means for successively receiving container bodies from the latter, said conveyor having spaced feed fingers thereon for successively engaging the rear ends of container bodies delivered thereto by said feeding means to continuously and successively propel said bodies further along said support and into contact with one another in end to end abutting relation, guide means disposed adjacent said conveyor and engageable with the wall surfaces of the containers for maintaining the abutting containers in alignment, the upper container body engaging run of said endless conveyor diverging away from said support to gradually and successively release said feed fingers from their respective engagement with the container bodies propelled thereby so that a said conveyor finger through its direct engagement with the rear end of a container body propelled thereby further serves to propel through said body the preceding bodies in end to end abutting relation along said support, and a fixed spray nozzle disposed adjacent said support in advance of said conveyor and operative upon the preceding abutting bodies not directly engaged by said conveyor fingers for continuously projecting a liquid coating material successively against the wall surfaces of said bodies.

JOHN P. JAKOB.

REFERENCES CITED

The following references are of record in the file of this patent:

UNITED STATES PATENTS

| Number | Name | Date |
|---|---|---|
| 2,166,598 | Kronquest | July 18, 1939 |
| 2,220,107 | Holloway | Nov. 5, 1940 |
| 2,254,336 | Von Sydow, et al. | Sept. 2, 1941 |
| 2,322,221 | Cereghino | June 22, 1943 |